UNITED STATES PATENT OFFICE.

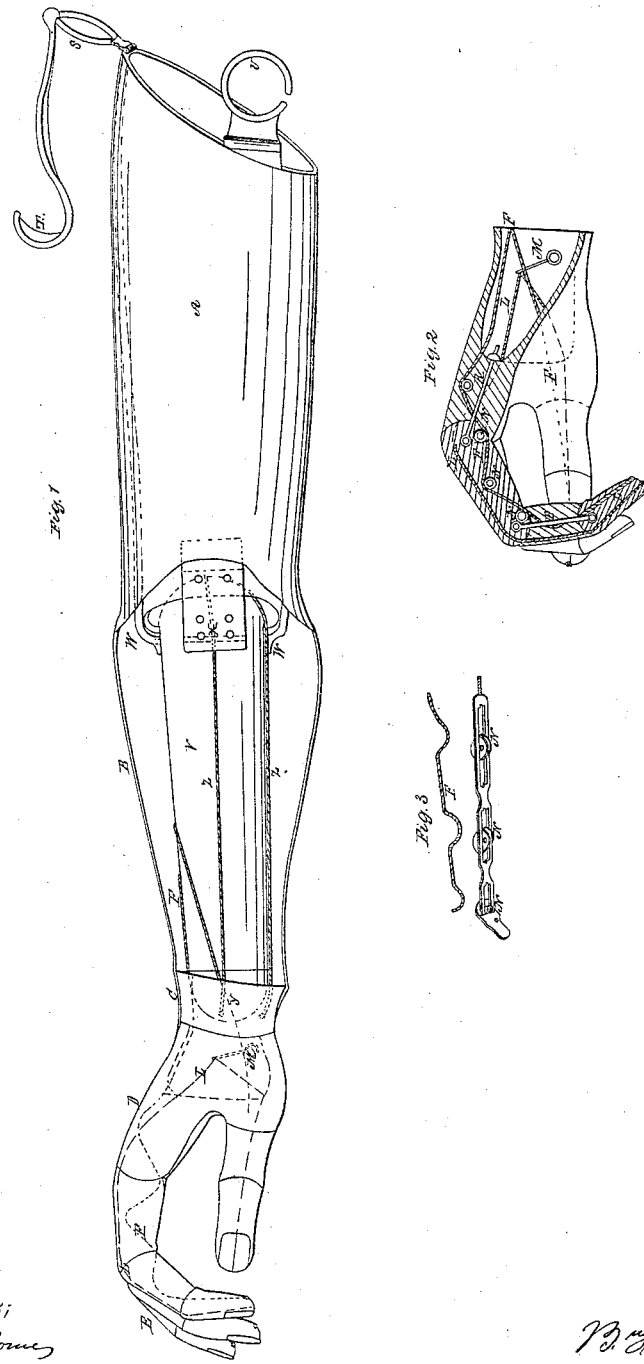
B. F. Palmer,
Artificial Arm.
Nº 22,576.                    Patented Jan. 11, 1859.

B. FRANK PALMER, OF PHILADELPHIA, PENNSYLVANIA.

ARTIFICIAL ARM AND HAND.

Specification of Letters Patent No. 22,576, dated January 11, 1859.

*To all whom it may concern:*

Be it known that I, B. FRANK PALMER, of Philadelphia, in the State of Pennsylvania, have invented a new and useful Artificial Hand and Arm; and I do hereby declare that the following is a correct description of the same, reference being had to the accompanying drawings, in which—

Figure 1 represents an artificial arm to be used in a case where the amputation has been above the elbow. Fig. 2, is a longitudinal section of the artificial hand. Fig. 3 shows the steel skeleton of a finger, and the flexor tendon which bends it.

The same part is indicated by the same letter of reference in all the figures.

The nature of my invention consists in the various improvements in the construction of artificial hands and arms hereinafter more particularly described, whereby a limb is produced which combines lightness and strength and which resembles the natural one in appearance and is capable, at the will of the wearer, of many of the natural movements such as flexion of the elbow and wrist, opening and closing of the hand, and of individual fingers, and pronation and supination of the wrist.

In the drawings A marks the arm; B the forearm; C the wrist; D, the hand; E the fingers; F the flexor tendons of the fingers; L, extensor tendons; M spring retracting extensor tendons; N fixed sheaves over which the flexor tendons play; P steel piece connecting the first and third joints of the finger, and on which the second joint is free to move; R steel piece forming the hinge at the knuckle joint; S, ring to which one end of the strap T is attached; U hook to which the free end of strap T is attached after attaching the arm to the body; V, conical wooden shaft forming the support of the forearm and terminating in the wrist and elbow joints; W elbow joint; X strap to stop the backward play of the elbow joint; Y ball and socket wrist joint; Z, Z, tendons of catgut attached to wrist, and playing over large end of conical shaft V.

The construction of the entire arm, (Fig. 1.) may be more particularly described as follows:—The upper portion, or arm proper, is hollow. It is made of English willow and covered with delicate fawn skin. At the elbows it receives the larger end of conical shaft V of the forearm to which it is connected by a hinge joint W, W, carefully bushed. The hinge bolt is held by two steel plates which pass in straight but divergent lines up the arm. A sufficient amount of friction is produced at the elbow joint by the contact of the rounded end of shaft V with the socket in which it plays, and by a slight spring of the steel plates that hold the hinge bolt to cause the arm to retain any angle of flexion that may be given to it. The backward play of this joint is prevented by the strap X attached to the arm A and to shaft V. This strap is sometimes attached permanently to the forearm, but so attached, by means of a clamp or otherwise, to the upper arm to be capable of contraction and expansion to aid the friction of the elbow joint in holding the arm firmly fixed at any angle in case of great strain, as in holding a heavy weight.

The elbow joint is similar to the knee joint of my patent leg, except that the friction is increased for the purpose just mentioned.

The shaft V connects the elbow and wrist joints. It is surrounded by an elastic covering of felt, which gives the natural shape to the forearm, and is itself covered by fawn skin. The larger or elbow end of shaft V is traversed by two grooves, at right angles to each other, which receive cords Z Z whose ends are fastened to the wrist C just beside the socket. The wrist joint is a ball and socket, capable of every motion of the natural wrist. The cords Z Z being tightly stretched, hold the ball and socket in close contact, and impart the necessary amount of friction to retain the wrist in any position which may be given to it in ordinary use.

The body of the hand is hollowed out as shown for the sake of lightness. To it the fingers are attached by means of ball and socket joints in which however they have only the natural vibratory motion. Their other joints are of a similar character. The fingers have two sets of tendons running through them, one set for the purpose of flexing, and the other for that of extending them. The flexor tendons are colored red in the drawing and marked F; the extensor tendons are colored blue and marked L. The extensor tendons run in grooves up the back of the fingers, and their lower ends are attached to springs M which retract them to open the fingers. The flexor tendons pass up the fingers in a sinuous course moving over the fixed grooved sheaves N, N, N, N, which are arranged so as to keep the tendon at the same distance from the center of motion of the joint in every position of the finger. In that part of the finger where there is no sheave the tendon moves in a sinuous groove. An effort to straighten the tendon results in the flexure of the finger.

The flexor tendons are united into a strap or muscle in the body of the hand or wrist, and this muscle is attached to the back of shaft V, so that forward flexure of the wrist tightens them and closes the fingers, while an opposite movement relaxes their grasp.

In order to obtain a greater degree of flexion and extension of the fingers and thumb, and to get a more powerful grasp, I shall in some instances carry the muscle just described up to the upper arm or shoulder, passing through the center of the elbow or on the back or front side, and use the clamp as in the forearm, hereinafter described.

I have contemplated forming the fingers on a skeleton of steel (shown in Fig. 7.). This skeleton is formed of links corresponding in length with the natural joints of the fingers. These links are hinged so as to be capable of forward flexion, but they are prevented from playing backward by stops. The necessary purchase to give power to the action of the tendon is obtained as before by means of the fixed grooved sheaves arranged as before described and as clearly shown in the figure. The tendon (F) when passed through the joints of the skeleton pursues a sinuous course, and the effort to straighten it results in the flexure of the finger. Although I have contemplated and claim this construction, my present experience leads me to prefer the finger formed mostly of willow, the second and third joints only being connected by a thin plate of steel P as seen in Fig. 3.

Where the amputation is above the elbow, and the entire artificial arm is employed, recourse will be had to the natural hand to effect the required movements of the artificial member. Thus the elbow may readily be bent to any desired position, the wrist flexed or rotated, and the hand closed or opened by natural and easy movements of the natural hand. The closure of the hand will be effected by bending the wrist forward, and it will be opened again by bending the wrist back.

The entire arm is attached to the shoulder by means of a long strap T which is passed first back of the neck across to the opposite shoulder, then under the opposite arm, round in front of the shoulder and again back of the neck to the front side of the shoulder, where it fastens to the hook U. This is found to give a very firm and comfortable attachment.

In an arm for this amputation it will probably be found best to keep the fingers semiflexed even in their most relaxed condition, as the command over the hand must necessarily be more limited than in the case of an amputation of the forearm.

Having thus fully described my invention what I claim therein as new and desire to secure by Letters Patent is as follows:—

1. Giving a sinuous course to the flexor tendons of the fingers by means of the sheaves for the purpose described.

2. Opening the fingers by means of extensor tendons antagonizing the flexors by means of springs substantially as described.

3. The wrist joint constructed as described of a ball and socket held in contact by cords Z, Z, arranged and operating substantially as specified.

4. Giving a soft and elastic covering to the shaft V and the wrist C for the purpose of imitating the changes of form which take place in the natural arm during the movements of the radius and the play of the pronator and supinator muscles substantially as described.

5. The mode herein described of attaching the arm to the body.

The above specification signed and witnessed this eighteenth day of September A. D. 1858.

B. FRANK PALMER.

Witnesses:
 BENJ. PATTON,
 J. BURCHARD.